May 9, 1939.                     C. DOERING                     2,157,199
                              ADVERTISING DEVICE
                            Filed Jan. 18, 1937            5 Sheets-Sheet 1

May 9, 1939.  C. DOERING  2,157,199
ADVERTISING DEVICE
Filed Jan. 18, 1937   5 Sheets-Sheet 4

Inventor
Charles Doering.
By Harry C. Lewis
Attorney

Patented May 9, 1939

2,157,199

UNITED STATES PATENT OFFICE 2,157,199

ADVERTISING DEVICE

Charles Doering, Chicago, Ill.

Application January 18, 1937, Serial No. 121,159

22 Claims. (Cl. 40—33)

This invention relates to display devices and more particularly to advertising sign display mechanisms, although certain features thereof may be employed with equal advantage for other purposes.

It contemplates more especially the provision of improved means for increasing the effect and enlarging the capacity of outdoor advertising devices without occupying any appreciable ground space.

Numerous types of advertising devices have heretofore been proposed for out-door use, but these occupy appreciable space compared to the capacity thereof to sustain advertising displays and otherwise are lacking in sustaining the advertising surface thereof in an effective position for vision by the passing public. Out-door advertising devices are usually positioned in places where ground space is an important consideration and where effectiveness in display is essential in order to warrant the expense incident thereto. Then, too, such advertising devices prove exceedingly expensive both in maintenance and ground rental unless the advertising capacity thereof is appreciably increased without detracting from the effectiveness thereof.

The increasing number of gasoline stations that require appreciable ground space and a provision for night lighting with the aid of tall poles that sustain the electric fixtures, present an opportune facility for effective out-door advertising devices that may be provided around and in association with lighting poles to present advertising space of effective and increasingly large capacity without requiring any appreciable ground space or extra lighting. This is similarly true of ordinary street lighting poles that could correspondingly serve as a support for an advertising device of increased effect and capacity without impairing the sightly appearance of the thoroughfare and, in fact, making an improvement therein by virtue of concealing unsightly light poles that are usually of non-uniform appearance and do not serve to improve the beauty of any vicinity.

One object of the present invention is to simplify the construction and improve the operation of devices of the character mentioned.

Another object is to provide an improved advertising device that has an appreciably larger advertising capacity and requires no additional ground space than other outdoor advertising devices.

Still another object is to provide an improved out-door advertising device of improved appearance and of appreciable greater capacity than other devices designed for the same purpose.

A further object is to provide an advertising device with a plurality of telescopically disposed surface members that serve to sustain advertising placards in conjunction with lighting equipment on thoroughfares and other out-door places.

A still further object is to provide a plurality of surface members disposed in vertically stepped relationship to provide an advertising device of substantially increased capacity and effectiveness.

Still a further object is to provide a plurality of relatively moveable surface members disposed in vertically stepped relationship to provide an advertising device of substantially increased capacity and effectiveness.

An additional object is to provide a plurality of relatively moveable surface members disposed in vertically stepped relationship in combination with mechanism for adjusting the relative positions of the component surface members for mounting and animating purposes.

Other objects and advantages will appear from the following description of an illustrative embodiment of the present invention.

The structure selected for illustration includes an elongated pole or standard member 10 that may be specially provided for an advertising structure embodying features of the present invention or such may comprise the usual lighting fixture pole member that is in general use along thoroughfares, in gasoline stations, and similar situations where advertising devices could be mounted for view by the passing public. Whether the pole or standard member 10 is specially provided in conjunction with the advertising device or the latter is built around an already existing pole or standard member 10, there is provided an enlarged base 11 for stabilizing purposes and to serve as a sturdy anchor for the pole or standard 10 together with any auxiliary instrumentalities as will appear more fully hereinafter.

The pole or standard 10 may terminate upwardly in arm members 12 of any desired design or configuration to receive electric fixtures 13 for illumination purposes. As shown, the top extremity 14 of the pole 10 is preferably outwardly flared to present an artistic design and to serve as a receptacle for an electric fixture 15 to provide additional beauty and illumination. The structure thus far described constitutes a popular form of electric lighting poles and gasoline station ground illuminating fixtures available in places where advertising would be profitable and desirable.

A tubular sign base 16 of cylindrical or other polygonal configuration is concentrically disposed relative to the central standard 10 for support upon the ground surface or foundation 17 to which it is attached in any suitable manner such as the provision of angle base flanges 18 having fastening studs 19 projecting therethrough for engagement with the proper mounts lodged in the ground or foundation 17. The tubular base member 16 terminates upwardly in a peripheral edge 20 that has, in this instance, a finishing flange 21 attached thereto in the usual manner to conform with the base flange 18 and present a pleasing appearance; however, the flange 21 may be dispensed with and the peripheral edge 20 merely reinforced as commercial practice may dictate.

Figures 3, 4, 5, 6, 7, 8, 9:
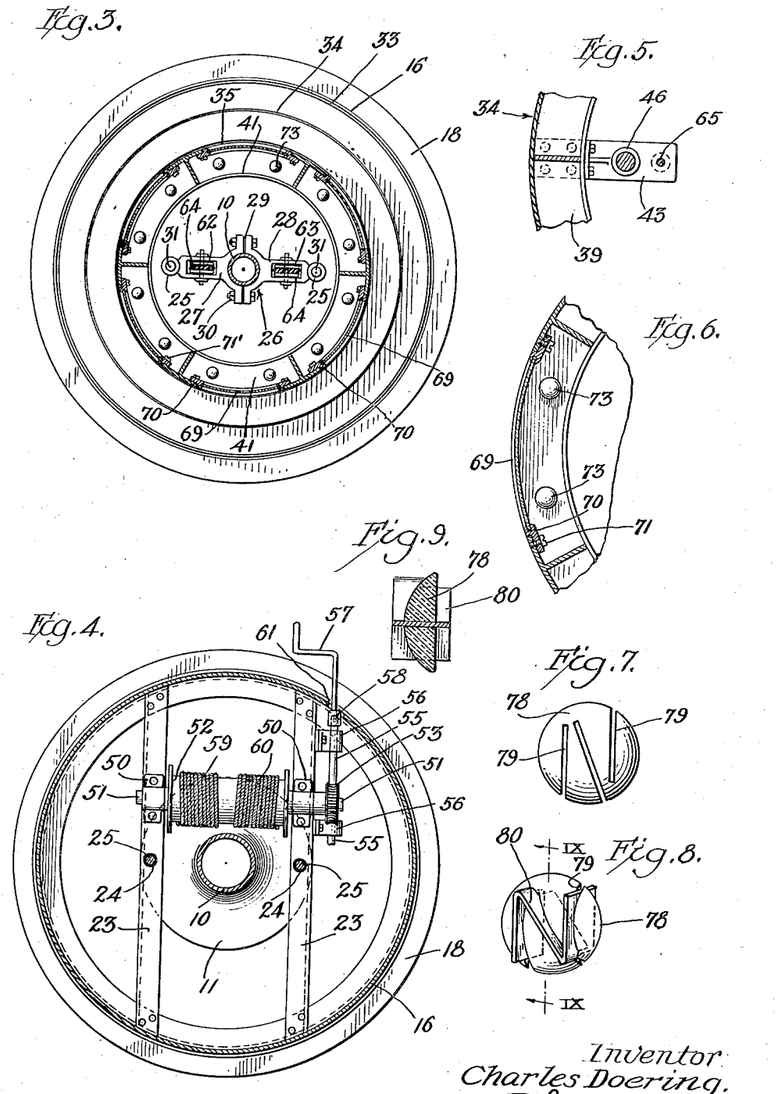
Figure 3 is a sectional view taken substantially along line III—III of Figures 1 and 2.
Figure 4 is a sectional view taken substantially along line IV—IV of Figure 1.
Figure 5 is a fragmentary sectional view taken substantially along line V—V of Figure 1.
Figure 6 is a fragmentary sectional view taken substantially along line VI—VI of Figure 1.
Figure 7 is a plan view of an indicia illuminator that is capable of use in connection with a surface member comprising a part of the body of the device shown in Figure 1.
Figure 8 is a perspective view of an indicia member shown in Figure 7 with the translucent indicia defining ribbon disposed therein.
Figure 9 is a sectional view taken substantially along line IX—IX of Figure 8.

In order to support the operating instrumentalities, a peripheral flange 22 is attached to the interior of the tubular base member 16 that supports a plurality of cross members 23, in this instance two, that are suitably apertured as at 24 (Figure 4) to receive vertical guide rods 25. The guide rods 25, in this instance two, extend upwardly from the cross-members 23 for attachment at their upper extremities to a horizontally disposed bracket 26 consisting of split complemental sections 27 and 28 attached to the central standard 10 by means of their confronting flanges 29 having fastening bolts 30 extending therethrough.

As shown, the bracket sections 27 and 28 are provided at their extremities with apertures 31 through which the guide rods 25 extend for permanent connection by resort to welding or other fastening expedients. For that matter, the rods 25 may be threaded at their upper extremities to receive threaded nuts 32 to maintain the guide rods 25 in their proper position relative to the bracket sections 27—28 without resort to welding or the like. A plurality of tubular members 33, 34 and 35, in this instance three, are provided as complements of each other in vertically stepped relation to define telescopically related surface members concentric of each other and the central pole or standard 10.

The tubular members 33, 34 and 35 are each provided with top and bottom peripheral flanges 36—37, 38—39, 40—41, respectively, to rigidify the structure and impart sufficient body thereto so as to render such form-sustaining and form-retaining for movement relative to each other as will appear more fully hereinafter. To this end, the lowermost tubular surface member 33 is of a diameter somewhat less than the tubular base member 16 for telescopic reception therein and moveable guidance by the rods 25. This moveable guidance is effected by diametrically extending brackets 42, 43 and 44 anchored to the lower peripheral flange of each of the tubular members 33, 34 and 35, respectively, by resort to any suitable fasteners such as the studs 45.

Then, too, the next successive tubular member 34 is of a diameter somewhat less than the interior diameter of the adjacent tubular member 33, and similarly the uppermost or next adjacent tubular member 35 is of a diameter somewhat smaller than the interior diameter of the next adjacent lower tubular member 34, so that each will be telescopically displaced relative to each other. The tubular members 33, 34 and 35 are disposed in vertically stepped relation and are guided relative to each other by means of the rods 25 cooperating with bushings 46 mounted proximate to the extremities of the brackets 42, 43 and 44 of each of the tubular members 33, 34 and 35, respectively.

A suitable canopy consisting of a conical disc sheet member 47 is stamped or otherwise shaped to present an axial flanged opening 48 that is fitted to the central pole or standard 10 and held at the desired elevated position by flanges 49 attached so as to be formed integrally with the central pole or standard 10 so as to sustain the disc-shaped canopy 47 at the desired elevation to serve as a cover for and preventing the entry of foreign substances within the tubular members 33, 34 and 35.

In order to displace or vary the relative positions of the tubular members 33, 34 and 35 so that they may be maintained, extended (Figures 1 and 12) or telescoped within each other (Figure 2) to afford mounting of advertising placards upon the exterior surfaces thereof, actuating instrumentalities are provided interiorly of the tubular base member 16 for mounting therein. To this end, two cross-members 23 (Figure 4) are provided with bearings 50 for the journalled support of a shaft 51 having a cylindrical sheave 52 attached thereto for rotation therewith. A worm-wheel 53 is fixed to the extremity of the shaft 51 for meshing engagement with a worm 54 fixed to a shaft 55 journalled in bearing brackets 56.

The worm shaft 55 is provided with a crank handle 57 having a coupler 58 at the extremity thereof to cooperate with a complemental extremity formed on the worm shaft 55 so that sheave 52 may be rotated in one direction or the other to wind or unwind flexible cables 59 and 60. To this end, the tubular base 16 is provided with an opening 61 in the wall thereof to permit the projection of the crank handle 57 therethrough (Figure 4) to engage the extremity of the shaft 55 to effect the rotation thereof.

As shown, the flexible cables 59 and 60 extend from the sheave 52 and frictionally engage the periphery of idler pulleys 62 and 63 journalled in slots 64 provided in the arms 27 and 28 of the sectional bracket member 26 fixed to the central pole or standard 10 proximate to the top of the uppermost tubular member 35 in an extreme operative position. In consequence thereof, the flexible cables 59 and 60 extend downwardly to engage the idler pulleys 62 and 63 and then are directed downwardly so as to project through apertures 65 (Figure 5) provided in the diametrical brackets 42, 43 and 44 of the tubular surface members 33, 34 and 35, respectively.

Figure 1:
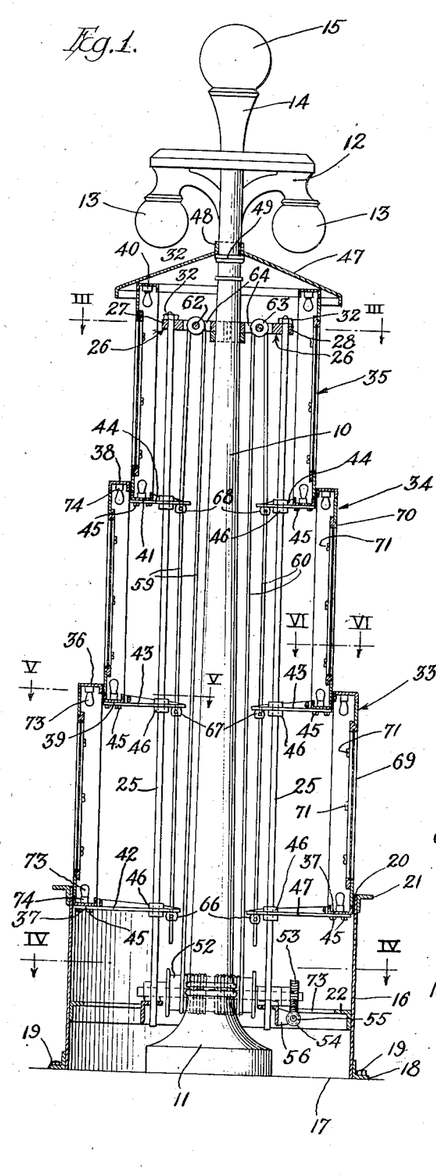
Figure 1 is a sectional view in elevation of a device embodying teachings of the present invention.
Figures 12, 13, 14:
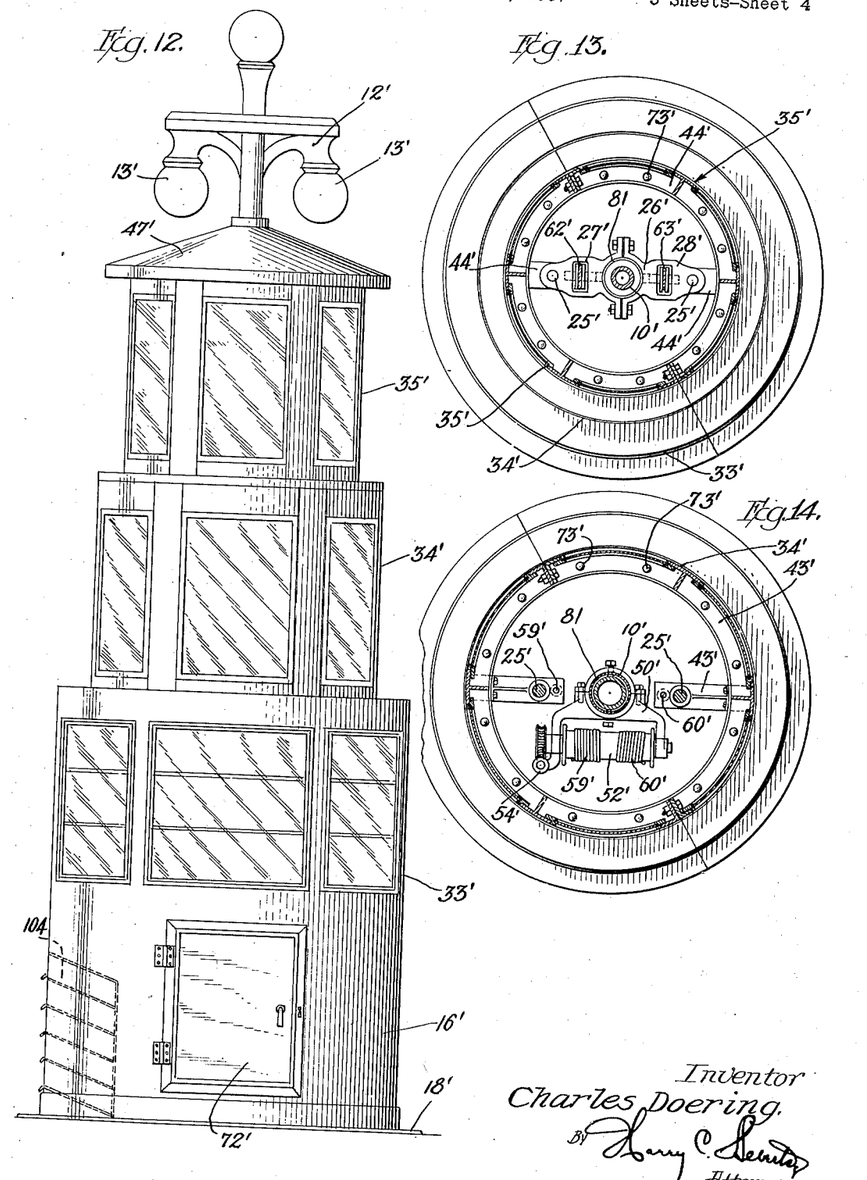
Figure 12 is a view in elevation of the devices shown in either Figures 1, 2, 10 and 11 with the surface members in their normal extreme upward position to present a plurality of telescopically associated surface members in vertically stepped relationship for receiving advertising placards.
Figure 13 is a sectional view taken substantially along line XIII—XIII of Figure 11.
Figure 14 is a sectional view taken substantially along line XIV—XIV of Figure 11.

In order to render the tubular members 33, 34 and 35 operative responsive to the flexible cables 59 and 60, metallic lugs 66, 67 and 68 are anchored to the flexible cables 59 and 60 beneath the adjacent and tubular member brackets 42, 43, and 44, respectively, so as to serve as elevators therefor responsive to winding the flexible cables 59 and 60 upon the sheave 52. The lugs 66, 67 and 68 are spaced along the flexible cables 59 and 60 at a distance substantially corresponding to the vertical height of the tubular members 33, 34 and 35 so that their predetermined telescopic relationship will always be maintained in their operatively extended position (Figures 1 and 12).

Figure 2:
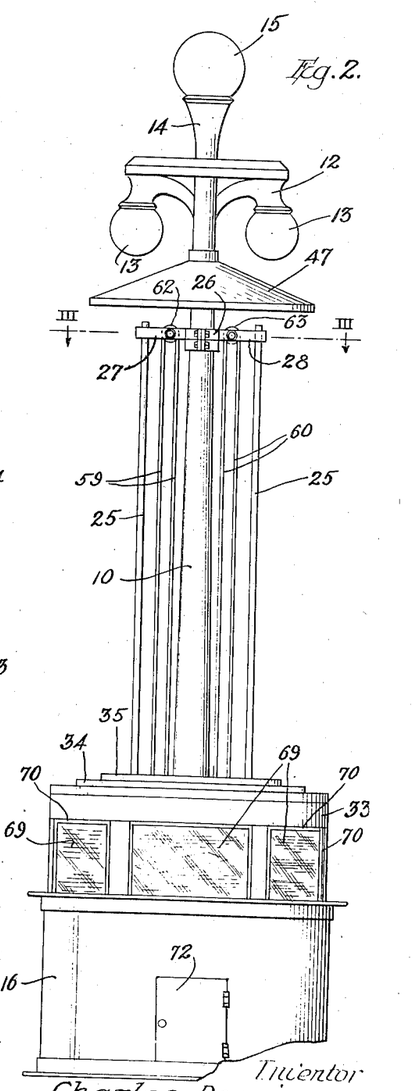
Figure 2 is a view in elevation of the device shown in Figure 1 with the surface members telescoped within each other in their extreme downward position.

When the flexible cables 59 and 60 are unwound from the sheave 52 by rotating the crank handle 57, the tubular members 33, 34 and 35 will descend uniformly until the lowermost tubular member reaches its downward limit within the base member 16 (Figure 2). Therefore, continued unwinding of the flexible cables 59 and 60 will cause or permit the next successive tubular member 34 with its uppermost tubular member 35 to descend within the tubular member 33 so that continued unwinding of the flexible models 59 and 60 further permits the descension of the uppermost tubular member 35 to its downward limit until they are telescoped within each other (Figure 2).

As each of the tubular members 33, 34, 35 arrive at a position immediately above the base member 16, the advertising panels 69 come within a height that enables the changing thereof by resort to an ordinary ladder or elevated portable platform. It is worthy of note that the pitch of the teeth in the wormwheel and worm 53 and 54 are such as to preclude movement of the sheave 52 responsive to the whole weight of the tubular members 33, 34 and 35. As a result, the tubular members 33, 34 and 35 are maintained in any adjusted position; however, locking means may be provided on the wormwheel 53 should commercial practice dictate or deem such expedient or necessary.

It is worthy of note that the tubular members 33, 34, and 35 are provided with a plurality of advertising panels 69 preferably though not essentially provided with rigid frames 70 that are detachably associated with the walls of the tubular members 33, 34 and 35 by means of threaded fasteners 71. The advertising panels and frames 69—70 are circumferentially spaced around each of the tubular members 33, 34 and 35, and receive advertising placards either by adhesion or by mere substitution of the frame 70 depending upon the dictates of commercial practice.

A door 72 is preferably provided in the tubular base member 16 so as to enable entry of an attendant within the confines thereof to either operate the sheave 52 and otherwise maintain the structure described herein. Suitable illumination in the form of electric bulbs may be provided interiorly of the tubular members 33, 34 and 35 should transparent panels 69 and advertising indicia be provided. In such event the electric bulbs 73 may be mounted in suitable sockets 74 fixed to the peripheral flanges 36—37, 38—39, and 40—41 of the tubular members 33, 34 and 35, respectively.

Figures 15, 16, 17, 18, 19, 20, 21, 22:
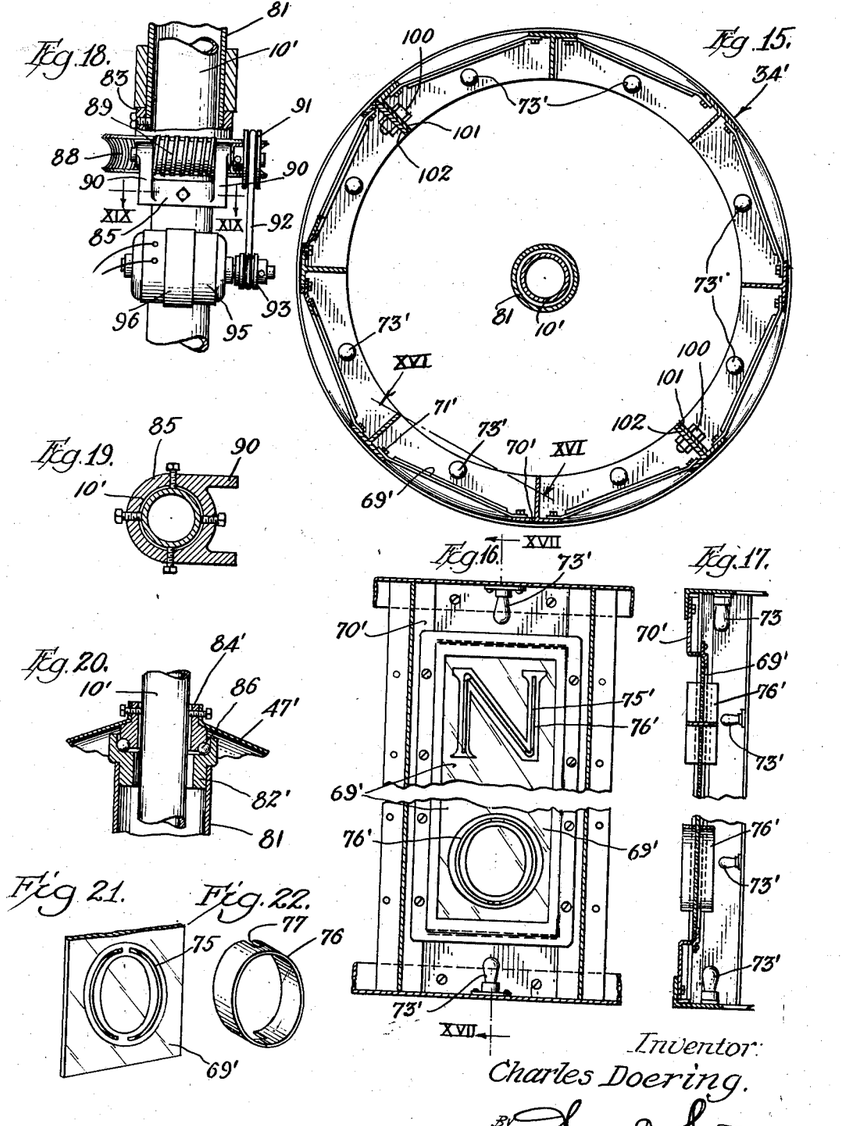
Figure 15 is a sectional view taken substantially along line XV—XV of Figure 11, the operating mechanism being displaced in this illustration to clarify the showing and it is to be noted that the surface members are straight rather than curved to define octagonal formation rather than a circular one as shown in Figures 1 to 5 inclusive.
Figure 16 is an enlarged sectional view of a surface member taken substantially along line XVI—XVI of Figure 15.
Figure 17 is a sectional view taken substantially along line XVII—XVII of Figure 16.
Figure 18 is a fragmentary sectional view of the rotating mechanism taken substantially along line XVIII—XVIII of Figures 10 and 11.
Figure 19 is a sectional view of a bracket taken substantially along line XIX—XIX of Figures 11 and 18.
Figure 20 is a sectional view taken substantially along line XX—XX of Figures 11 and 18.
Figure 21 is a fragmentary plan view of the panel member shown in Figure 16.
Figure 22 is a perspective view of the indicia defining ribbon shown in Figure 16 and serving as a complement of the panel member shown in Figure 21.

The panel and frames 69—70 may be of arcuate configuration to conform with the curvature of the tubular members 33, 34 and 35 or such may be flat as shown in the modified embodiment (Figure 15) wherein a panel 69' is attached to the frame 70' in a similar manner, but its flat contour imparts an octagonal or other polygonal effect rather than a circular configuration conforming to the structural contour of the tubular members 33, 34 and 35. To render the interior illuminators such as bulbs 73' (Figure 16) effective, the advertising panel 69' is mounted in the frame 70' through the medium of threaded fasteners 71'. To this end, the panel 69' is preferably provided with uninterrupted slots 75 and may define any suitable indicia (Figures 16 and 21) that generally define any desired indicia for the reception of a correspondingly shaped translucent ribbon 76 that extends therethrough and is uninterrupted with slots 77 so as to serve as a complement of the correspondingly slitted panel 69'.

The translucent ribbon is of any desired color and serves to emanate light through the edges thereof to provide the desired lighting effect and renders the advertising visible during the night time. While this particular construction of the advertising panels 69' may be deemed advantageous, yet the panels 69' may be of opaque or translucent material having an advertising placard directly applied to the exterior thereof or etched therein or otherwise treated depending upon any particular installation or the dictates of commercial practice.

It has also been found advantageous to provide panels 69 or 69' with convex lenses 78 of translucent or transparent material (Figures 7, 8 and 9) that are slotted as at 79 in any desirable manner or provided with a plurality of angularly related slots 79 to receive a translucent ribbon 80 of differently colored synthetic or composite material to define different indicia and to emanate light therethrough so as to provide a highly effective illuminated effect that is as satisfactory as neon lighting. The provision of such light emanators 78 in different color schemes and effects renders it possible to provide any desirable composite advertising effect.

For that matter, the interior illumination may be dispensed with, and the top stationary closure or cover 47 constructed from transparent or translucent material so that the light emanating from the regular electric lights 13 and 15 provided on the central pole or standard 10 may serve the same or equivalent purpose without requiring any additional illumination. Then, too, external illumination may be deemed more satisfactory and the electric bulbs 73 may be mounted externally rather than internally of each of the tubular members 33, 34 and 35 depending upon the type of advertising provided on the panel 69.

It is also possible to effect the rotation of the tubular members 33, 34 and 35 by providing the central pole or standard 10' (Figure 10) with a tubular sleeve 81 having a top end member 82 and a bottom member cooperating with bearings 84 and 85, respectively, fixed to the central pole or standard 10'. Special roller bearings 86 are disposed between the confronting parts of the sleeve 81 and the central pole or standard 10 so as to support the journalled sleeve 81 for free rotation. In this instance, the tubular members 33', 34' and 35' are mounted relatively to each other in a manner described supra in connection with the embodiment shown in Figures 1 to 6 inclusive.

In this instance, however, the sectional bracket 26' with its arm 27' and 28' are in fixed attachment to the sleeve 81 rather than to the pole 10', and similarly the sheave 52' with its supporting brackets 50' are fixed proximate to the lower extremity of the sleeve 81 so as to rotate therewith and permit the flexible cables 59' and 60' to operatively telescope and extend the tubular members 33', 34' and 35' respectively and enable the rotary operation thereof.

As in the previous embodiment, a sheave 52' has its wormwheel 53' operated by a worm 54' that is hand rotated by a shaft 55' through the instrumentality of a hand crank detachably associated therewith. In order to effect the rotation of the sleeve 81 with the tubular members 33' and 34' and 35', the lowermost sleeve bracket 83' has a wormwheel integrally or otherwise connected therewith to cooperate with the horizontally disposed worm 89 journaled in brackets 90 fixed to the lower end bearing 85. The shaft of the worm 89 has a pulley 91 fixed thereto for cooperation with an endless belt 92 that engages the pulley 93 fixed to the axial shaft 94 of an electric motor 95.

Figure 11:
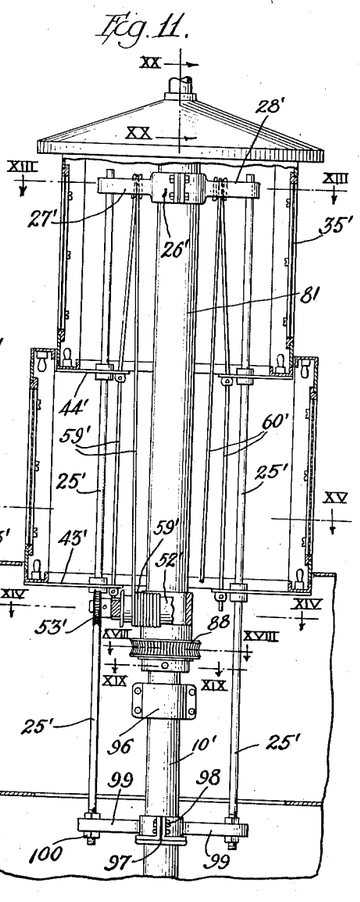
Figure 11 is a view similar to Figure 10 from a different angular position disposed 90° relative to Figure 10.

The electric motor 95 has its base fixed to a bracket 96 that surrounds the central pole or standard 10'. In consequence thereof, rotation of the sleeve 81 relative to the central pole or standard 10 is effected without disturbing the telescopic arrangement or control mechanism for the tubular sign members 33, 34, and 35. In this embodiment, however, it is found preferable to have the guide rods 25' supported by the central pole or standard 10' which is provided with a fixed flange proximate to the lower extremity thereof to receive a sectional bearing 98 having arms 99 extending therefrom to receive the extremities of the guide rods 25' (Figure 11) therethrough. Threaded nuts 100 engage the correspondingly threaded extremity of the guide rods 25' so that they may be rotated relative to the central pole or standard 10' and simultaneously serve as a support thereof.

It is possible, also, to provide and attach a reversible motor to the shaft 55' of the worm 54' so that such may be actuated to effect the extension or telescopic collapsing of the tubular members 33', 34' and 35'. In fact, such may be intermittently collapsed and extended should commercial practice dictate by providing upwardly actuating and control means to the shaft 55' and produce this effect in conjunction with or in the absence of the rotating operation effected by the worm 89 through the medium of a reversible electric motor 95.

Then, too, the tubular members 33', 34', and 35' may be placed in rigid vertically stepped relationship without any collapsing thereof and such provided only with rotating means should it be desired to further simplify the construction and provide an impressive advertising device of increased capacity. Such a device is compact, effective, and capable of application to standard thoroughfare and outside lighting poles so that the tubular members 33', 34' and 35' may be assembled around an already existing central pole or standard 10' without the requirement of displacing such over the top end thereof and the tubular members 33', 34' and 35' may be sectional in construction.

To this end, the tubular members 33', 34' and 35' preferably consist of two sections complemental to each other and attached to each other by means of fastening bolts and nuts 100 extending through confronting flanges 101 and 102 of each section. As a result, each of the sections can be assembled around the central pole or standard 10' or its surrounding sleeve 81 depending upon the type of device and the dictates of commercial practice; however, the central pole or standard 10' may be specially constructed as an element of the assembled members described supra depending upon any particular installation and the requirements thereof.

Figure 10:
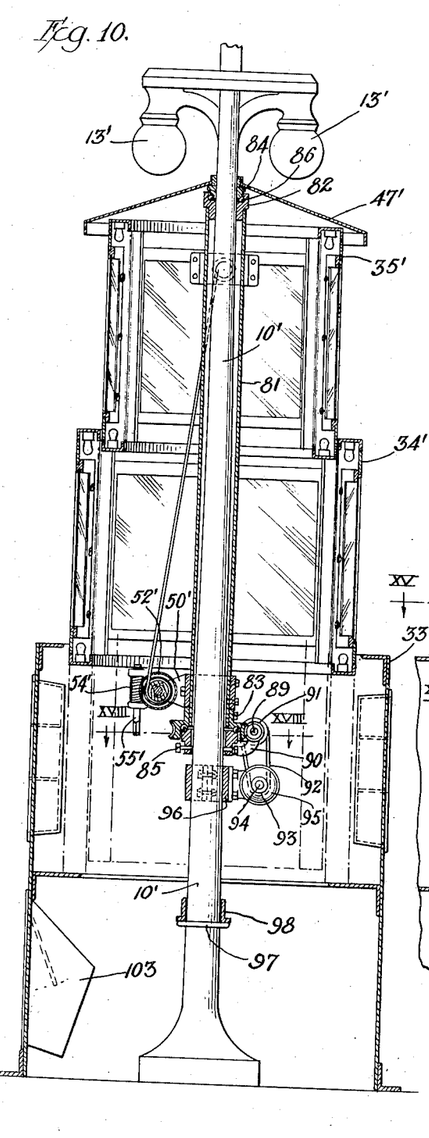
Figure 10 is a sectional view in elevation of a modified form of device showing means for rotating the surface members in conjunction with the means for effecting the telescopic displacement thereof.

In the event the advertising devices are constructed for use around lighting poles 10 or 10' already in existence along thoroughfares or any gasoline stations or other situations, the tubular base member 16 may be utilized as a temporary shelter or storage space with its interior constructed to provide a refuse container or containers 103 (Figure 10). Then, too, a plurality of newspaper compartments 104 may be also provided in the lower tubular base member 16' (Figure 12) so that the structure can be put to every productive purpose and the space utilized to the best advantage. In this embodiment, it should be noted that the lower telescopic member 33' constitutes an integral part of the base 16' rather than sectional telescopic members as in the previously described embodiment shown in Figures 1 to 6.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:—

1. In an advertising appliance of the character described comprising a frame, a central standard to support said frame, and a plurality of vertically stepped surface members associated with said frame, said surface members being mounted in predetermined spaced relationship relative to each other.

2. In an advertising appliance of the character described, the combination with a central supporting standard, of a framework associated with said central supporting standard, a plurality of surface members associated with said frame, said surface members being moveably associated with said framework in overlapping relationship relative to each other, and means for adjusting the relative position of said surface members for the purposes set forth.

3. In an advertising appliance of the character described, the combination with a frame, of a plurality of tubular surface members associated with said frame for movement along a predetermined path, said surface members being telescopically disposed in overlapping relationship relative to each other, means within the confines of said tubular surface members to guide their movement along a predetermined path, and means for adjusting the relative position of said surface members.

4. In an advertising appliance of the character described, the combination with a frame, of central standard to support said frame, a plurality of tubular surface members associated with said frame for movement along a predetermined path, said surface members being telescopically disposed in overlapping relationship relative to each other, means within the confines of said tubular surface members to guide their movement along a predetermined path, means for adjusting the relative position of said surface members, and means for maintaining said surface members in adjusted positions.

5. In an advertising device of the character described, the combination with substantially cylindrical members having their peripheral exterior walls provided with advertising frames, said members being of substantially different diameters to present a stepped formation therebetween in axially aligned nested relation, and means for illuminating said frames for the purpose set forth.

6. In an advertising device of the character described, the combination with substantially cylindrical members having their peripheral exterior walls provided with advertising frames, said members being in axially disposed nested relation, means within the confines of said cylindrical members to guide their movement along a predetermined path, means for illuminating said frames for the purpose set forth, and means for telescopically displacing said cylindrical members relative to each other along said guide means.

7. In an advertising device of the character described, the combination with substantially cylindrical members having their peripheral exterior walls provided with advertising frames, said members being in axially disposed nested relation, means for illuminating said frames for the purpose set forth, means for telescopically displacing said cylindrical members relative to each other, and means for rotating said cylindrical members.

8. In an advertising device of the character described, the combination with a stationary cylindrical base member, of a smaller cylindrical member axially aligned with and nested in said cylindrical base member to present a peripheral horizontal step therebetween, and means for axially displacing said smaller nested cylindrical member relative to said base member.

9. In an advertising device of the character described, the combination with a stationary cylindrical base member, of a plurality of nested cylindrical members axially aligned with said base member, means for displacing said nested cylindrical members relative to said base member, and means for rotating said nested cylindrical members relative to said base member.

10. The combination with an axial elongated pole member, of a plurality of nested cylindrical sign members associated with said pole member in encircling relationship therewith, actuator means fixed to said pole member, and means interposed between said actuator means and said nested cylindrical members to displace the latter axially of said pole member.

11. The combination with an axial elongated pole member, of a plurality of nested cylindrical sign members associated with said pole member in encircling relationship therewith, actuator means fixed to said pole member, means interposed between said actuator means and said nested cylindrical members to displace the latter axially of said pole member, and means for rotating said cylindrical members in unison.

12. The combination with an axial elongated pole member, of a plurality of nested cylindrical sign members associated with said pole member in encircling relationship therewith, a stationary cylindrical base member concentric with and of a diameter larger than any of said nested cylindrical sign members, actuator means fixed to said pole member, and means interposed between said actuator means and said nested cylindrical members to displace the latter axially of said pole member and said base member.

13. The combination with an axial elongated pole member, of a plurality of nested cylindrical sign members associated with said pole member in encircling relationship therewith, a stationary cylindrical base member concentric with and of a diameter larger than any of said nested cylindrical sign members, guide rods interposed between said nested cylindrical sign members, actuator means fixed to said pole member, and means interposed between said actuator means and said nested cylindrical members to displace the latter axially of said pole member and said base member.

14. The combination with an axial elongated pole member, of a plurality of nested cylindrical sign members associated with said pole member in encircling relationship therewith, a stationary cylindrical base member concentric with and of a diameter larger than any of said nested cylindrical sign members, actuator means fixed to said pole member, means interposed between said actuator means and said nested cylindrical members to displace the latter axially of said pole member and said base member, and means for illuminating said sign members.

15. The combination with an axial alongated pole member, of a plurality of nested cylindrical sign members associated with said pole member in encircling relationship therewith, actuator means fixed to said pole member, and flexible means interposed between said actuator means and said nested cylindrical members to displace the latter axially of said pole member.

16. The combination with an axial elongated pole member, of a plurality of nested cylindrical sign members associated with said pole member in encircling relationship therewith, actuator means fixed to said pole member, and flexible means interposed between said actuator means and said nested cylindrical members to displace the latter axially of said pole member, said actuator means including a sheave for receiving said flexible means in winding engagement therewith, a crank, and gear means interposed between said sheave and crank.

17. The combination with an axial elongated pole member, of a plurality of nested cylindrical sign members associated with said pole member in encircling relationship therewith, a stationary cylindrical base member concentric with and of a diameter larger than any of said nested cylindrical sign members, actuator means fixed to said pole member, means interposed between said actuator means and said nested cylindrical members to displace the latter axially of said pole member and said base member, and means for illuminating said sign members.

18. The combination with an axial elongated pole member, of a plurality of nested cylindrical sign members associated with said pole member in encircling relationship therewith, a stationary cylindrical base member concentric with and of a diameter larger than any of said nested cylindrical sign members, actuator means fixed to said pole member, means interposed between said actuator means and said nested cylindrical members to displace the latter axially of said pole member and said base member, sign receiving frames circumferentially spaced along the periphery of said nested sign members, and means for illuminating said sign members.

19. The combination with an axial elongated pole member, of a plurality of nested cylindrical sign members associated with said pole member in encircling relationship therewith, a stationary cylindrical base member concentric with and of a diameter larger than any of said nested cylindrical sign members, actuator means fixed to said pole member, means interposed between said actuator means and said nested cylindrical members to displace the latter axially of said pole member and said base member, sign receiving frames circumferentially spaced along the periphery of said nested sign members, said sign receiving frames being detachably associated with said nested cylindrical members, and means for illuminating said sign members.

20. The combination with an axial elongated pole member, of a plurality of nested cylindrical sign members associated with said pole member in encircling relationship therewith, a stationary cylindrical base member concentric with and of a diameter larger than any of said nested cylindrical sign members, actuator means fixed to said pole member, means interposed between said actuator means and said nested cylindrical members to displace the latter axially of said pole member and said base member, sign receiving frames circumferentially spaced along the periphery of said nested sign members, said sign receiving frames being detachably associated with said nested cylindrical members, means for illuminating said sign members, and means for rotating said nested cylindrical sign members.

21. In an advertising device of the character described, the combination with a stationary cylindrical base member, of a smaller cylindrical member axially aligned with said cylindrical base member to present a peripheral horizontal step therebetween, and advertising receiving frames detachably associated with the vertical walls of said cylindrical members.

22. In an advertising device, the combination with a plurality of cylindrical members of different diameters vertically disposed in axial relation to present a stepped peripheral shoulder therebetween, and advertising frames detachably associated with the vertical surface walls of said cylindrical members.

CHARLES DOERING.